(12) United States Patent
Shukla

(10) Patent No.: US 7,221,532 B1
(45) Date of Patent: May 22, 2007

(54) DISK DRIVE SERVO WRITING USING STYLUS TO SENSE VIBRATION BETWEEN AN ACTUATOR ARM AND A SERVO WRITER PUSH-ARM

(75) Inventor: Dinesh Shukla, Rutland, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/284,112

(22) Filed: Nov. 21, 2005

Related U.S. Application Data

(60) Provisional application No. 60/678,514, filed on May 6, 2005.

(51) Int. Cl.
*G11B 21/02* (2006.01)
*G11B 21/08* (2006.01)
*G11B 5/596* (2006.01)

(52) U.S. Cl. .................. 360/75; 360/264.1; 360/78.04
(58) Field of Classification Search ...................... None
See application file for complete search history.

(56) References Cited

U.S. PATENT DOCUMENTS 6,078,458 A  6/2000 Fioravanti et al. ....... 360/73.03
6,147,831 A * 11/2000 Kennedy et al. ............... 360/75
6,867,949 B1  3/2005 Guo et al. ............... 360/265.6
7,050,259 B1 * 5/2006 Guo et al. ..................... 360/75

* cited by examiner

*Primary Examiner*—Andrew L. Sniezek
(74) *Attorney, Agent, or Firm*—Myers Bigel Sibley & Sajovec, P.A.

(57) ABSTRACT

Embodiments of the present invention are directed to methods of making a disk drive and related servo writers. The disk drive includes a data storage disk, an actuator arm, and a head connected to the actuator arm. The disk drive is connected to a servo writer that includes a push-arm that is configured to radially move the actuator arm relative to the disk. The method includes moving the push-arm of the servo writer a defined distance to push the actuator arm and position the head at a defined radial location on the disk. Servo fields are written through the head along an arc at the defined radial location on the disk. A sensor that contacts the actuator arm is used to generate an electrical vibration signal that is indicative of vibration between the push-arm and the actuator arm.

30 Claims, 4 Drawing Sheets

DISK DRIVE SERVO WRITING USING STYLUS TO SENSE VIBRATION BETWEEN AN ACTUATOR ARM AND A SERVO WRITER PUSH-ARM

RELATED APPLICATION

This application claims the benefit of and priority to U.S. Provisional Patent Application No. 60/678,514, filed May 6, 2005, the disclosure of which is hereby incorporated herein by reference as if set forth in its entirety.

FIELD OF THE INVENTION

The present invention generally relates to disk drive manufacturing. More particularly, the present invention relates to the servo writing process of disk drive manufacturing in which a push-arm assembly comes into contact with an actuator arm assembly.

BACKGROUND OF THE INVENTION

Disk drives are commonly used in microprocessor based electronic devices, such as workstations, personal computers, laptops and other computer systems, to store and retrieve large amounts of data. A typical disc drive includes a plurality of magnetic discs that are rotated by a spindle motor and an actuator arm assembly that includes read/write heads mounted to flexure arms. An actuator motor (e.g., voice coil motor) can rotate the flexure arms and heads about a pivot bearing relative to the disks. The heads are configured to fly upon air bearings in very close proximity to the rotating disks.

The surface of each disc is divided into a series of data tracks which are spaced radially from one another across a band having an inner diameter and an outer diameter. The data tracks extend circumferentially around the discs and store data in the form of magnetic flux transitions on the disc surfaces. Each data track is divided into a number of data sectors that store fixed sized blocks of user data. Embedded among the data sectors on each track are servo fields that define servo information that enables the disc drive to control the radial position of the heads relative to tracks on the discs and to determine the circumferential location of the heads.

The servo fields are written to the discs during the manufacture of a disc drive using a highly precise servo track writer, which utilizes the heads of the disc drive to write the servo fields. As the servo fields are used to define the tracks, it is important to precisely control the position of the heads as the servo fields are written to the disc surfaces. Thus, a typical servo track writer includes a positioning system which advances the position of the heads, a position detector which estimates the position of the heads and control circuitry which provides the servo information to be written as the servo fields on the disks.

In one type of servo track writer, the positioning system includes a push pin assembly that engages the actuator arm assembly through an opening in the disc drive base deck. A positioner moves the push pin to radially position the heads while the servo fields are written on the disk.

As will be recognized, proper radial alignment of the servo fields is essential to facilitate reliable operation of the disc drive. For example, when errors are introduced in the placement of the servo fields, components at corresponding frequencies can appear in a position error signal (PES) generated by the servo system during subsequent operation of the drive. The PES is a measure of the relative position of a selected head with respect to an associated track, and is used primarily during track following operations to maintain the head over the center of the track. Thus, such frequency components appearing in the PES for a selected track will result in the repeated adjustment of the position of the head by the servo system in an attempt to maintain the head over the center of the track during each revolution of the disc. When such frequencies are sufficiently severe, the correction required to account for these frequencies may use an unacceptable amount of the bandwidth of the servo system and/or may limit the overall track density that can be obtained on the disks.

It is known that the excitation of system resonances of the servo track writer can result in oscillations at the heads, leading to errors in the placement of the servo fields and causing corresponding frequency components to be generated in the PES during subsequent disc drive operation. System resonances can be excited from, for example, vibrations generated by the operation of the disc drive spindle motor and/or wind buffeting of the actuator arm assembly (referred to as windage) during rotation of the discs as the servo fields are written.

Attempts to minimize the effects of system resonances have included efforts to stiffen the push-pin and the associated push-pin assembly, as well as installing a soft, energy-absorbing material between the push-pin and the actuator arm assembly. However, to date such efforts have not been completely successful in eliminating the effects of resonances during the writing of the servo fields. Moreover, as disc drive track densities increase, greater demands are placed upon servo track writers to accurately locate the servo fields on the discs; thus, vibration levels that were acceptable for earlier generations become increasingly unacceptable for later generations of drives.

Accordingly, there is a need for an improved approach to reducing the effect of system resonances in a disc drive servo track writer in order to reduce or eliminate the effects of frequency components in a PES generated from the servo fields during subsequent disc drive operation.

SUMMARY OF THE INVENTION

Some embodiments of the present invention provide a method of making a disk drive. The disk drive includes a data storage disk, an actuator arm, and a head connected to the actuator arm. The disk drive is connected to a servo writer that includes a push-arm that is configured to radially move the actuator arm relative to the disk. The method includes moving the push-arm of the servo writer a defined distance to push the actuator arm and position the head at a defined radial location on the disk. Servo fields are written through the head along an arc at the defined radial location on the disk. A sensor that contacts the actuator arm is used to generate an electrical vibration signal that is indicative of vibration between the push-arm and the actuator arm.

The movement of the push-arm may be controlled responsive to the vibration signal to reduce vibration between the actuator arm and the push-arm, such as by active damping and adaptive control. For example, the push-arm may be moved out-of-phase to the vibration indicated by the vibration signal to actively dampen the vibration between the actuator arm and the push-arm.

The actuator motor may be controlled to vary bias force of the actuator arm against the push-arm responsive to the vibration signal to reduce the vibration.

A time series of samples of the vibration signal may be logged while servo fields are written through the head on the disk. Writing of servo fields on the disk may be prevented in response to the vibration signal indicating more than a threshold amount of vibration. At least a partial rewrite of servo fields on the disk may be initiated responsive to the vibration signal indicating more than a threshold amount of vibration.

The sensor may include a stylus sensor connected to the push-arm and having a stylus member that contacts and is biased against the actuator arm when the push-arm contacts the actuator arm. The stylus sensor may include a piezoelectric device, an inductive apparatus, and/or a voltage generator apparatus.

In some other embodiments of the present invention, a servo writer is configured to write servo fields in a disk drive. The servo writer includes a push-arm, a positioner, a sensor, and a control unit. The push-arm is configured to radially move the actuator arm relative to the disk. The positioner is configured to move the push-arm a defined distance to push the actuator arm and position the head at a defined radial location on the disk. The sensor is configured to contact the actuator arm and to generate an electrical vibration signal that is indicative of vibration between the push-arm and the actuator arm. The control unit is configured to write servo fields through the head along an arc at the defined radial location on the disk while the sensor is generating the vibration signal indicative of relative vibration between the push-arm and the actuator arm.

DETAILED DESCRIPTION OF THE INVENTION

Figure 1:
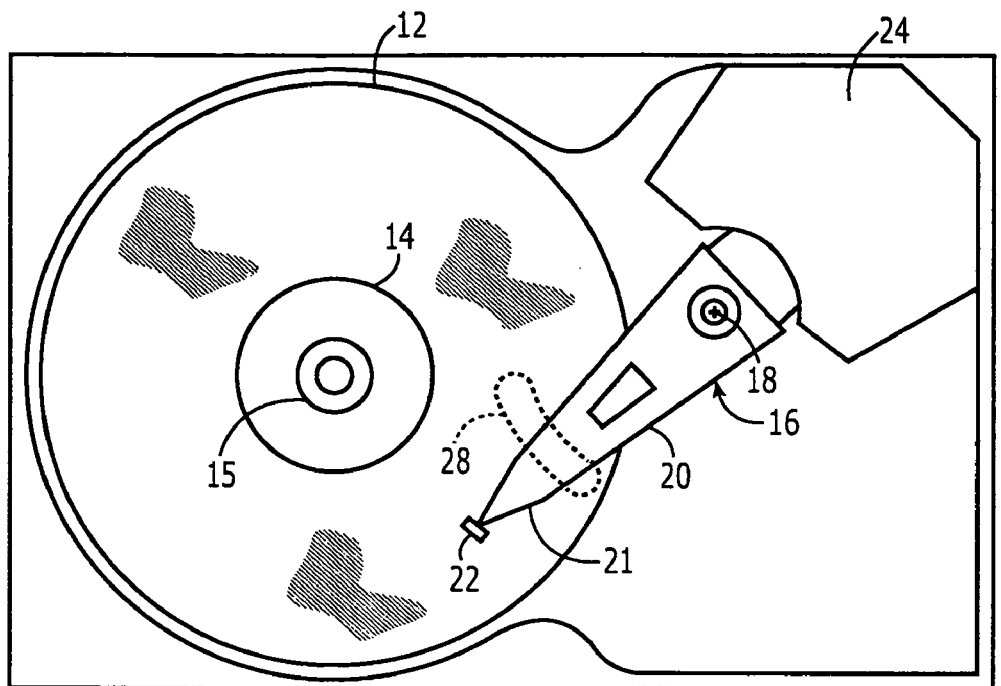
FIG. 1 is a top view of a conventional disk drive.

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, micro-code, etc.). Consequently, as used herein, the term "signal" may take the form of a continuous waveform and/or discrete value(s), such as digital value(s) in a memory.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

By way of initial summary, embodiments of the present invention relate to methods and apparatus for precisely monitoring the position of a read/write head during servo writing by a servo writer and associated methods of making disk drives and, more particularly, to methods and servo writers that write servo fields onto one or more disks of a disk drive while monitoring vibration between an actuator arm and a push-arm used to position the actuator arm and read/write head. As will be explained in detail below, a sensor, such as a stylus sensor, contacts the actuator arm and generates an electrical vibration signal that is indicative of vibration between the actuator arm and the push-arm. The vibration signal can be used to actively control positioning of the push-arm and/or actuator arm to reduce the vibration, to control the writing of servo fields on the disk, and/or it can be sampled and logged for other analysis. As used herein, "push-arm" refers to any arm that is configured to be moved to push the actuator arm and position the head relative to a disk, and may include, but is not limited, to a push-pin.

Figure 2:
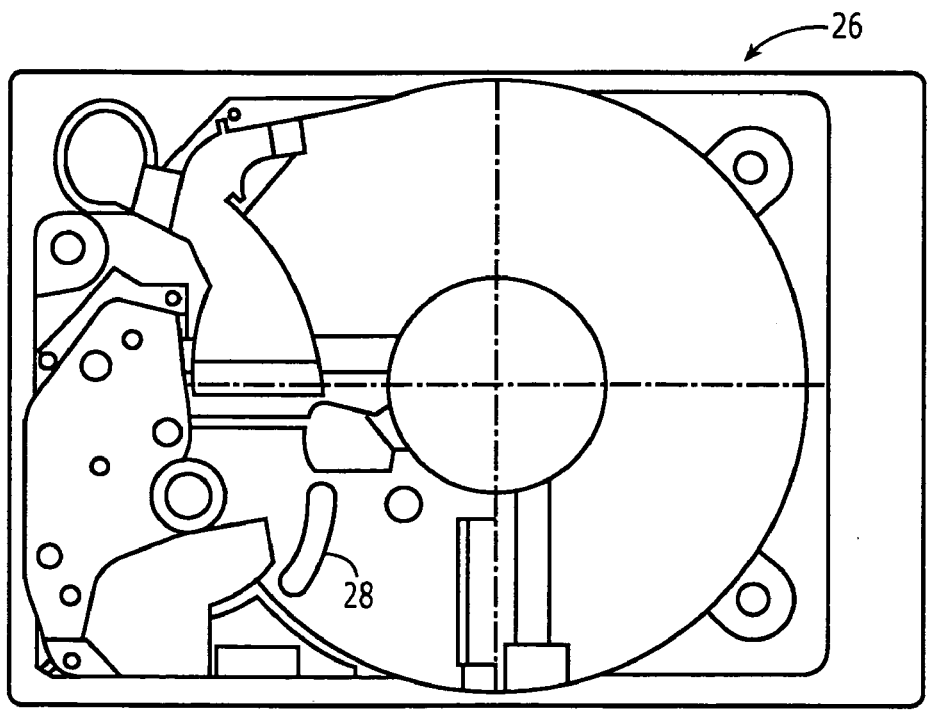
FIG. 2 is a top view of the base of the conventional disk drive of FIG. 1, illustrating an exemplary push-arm hole through which at least a portion of a push-arm assembly can extend for servo writing operations.

FIGS. 1–2 show a top view of a conventional disk drive 10 that generally includes a base plate 26, a cover (not shown), and one or more data storage disks 12 of any appropriate digital data storage media. The one or more disks 12 are mounted on a rotatable hub 14, which in turn is rotatably interconnected with the disk drive base plate 26 and/or cover. The disks 12 may be made from glass, ceramic, or various metals, and each disk 12 can include first and second opposing disk surfaces on which concentric tracks may be defined for storing digital data. A spindle motor 15 is coupled to the rotatable hub 14 to simultaneously spin the disks 12 at, for example, a substantially constant rate. For example, disks in some current disk drives are spun in a range of about 5,400 RPM to up to about 15,000 RPM, although embodiments of the present invention outside this exemplary range are contemplated.

The disk drive 10 also includes an actuator arm assembly 16 that pivots about a pivot bearing illustrated by axis 18, which in turn is rotatably supported by the base plate 26 and/or cover. The actuator arm assembly 16 includes one or more individual actuator arms 20 that extend out from near the pivot bearing axis 18. Each actuator arm 20 generally includes a suspension 21 and a head 22 disposed at or near an end of each suspension 21. The head 22 typically includes a slider that is configured to fly on an air cushion adjacent to a surface of a corresponding disk, and at least one transducer that is configured to read/write signals on the adjacent disk 12. The actuator arm assembly 16 may include a plurality of actuator arms 20 each configured to radially position a connected head adjacent to a different surface of the disks 12.

An actuator motor 24, such as a voice coil motor (VCM), operatively interfaces with the actuator arm assembly 16 generally at an end thereof that is opposite the head 22. The actuator motor 24 moves the actuator arm assembly 16, and thus the head 22 (e.g. in response to an actuator motor control signal).

Figure 3:
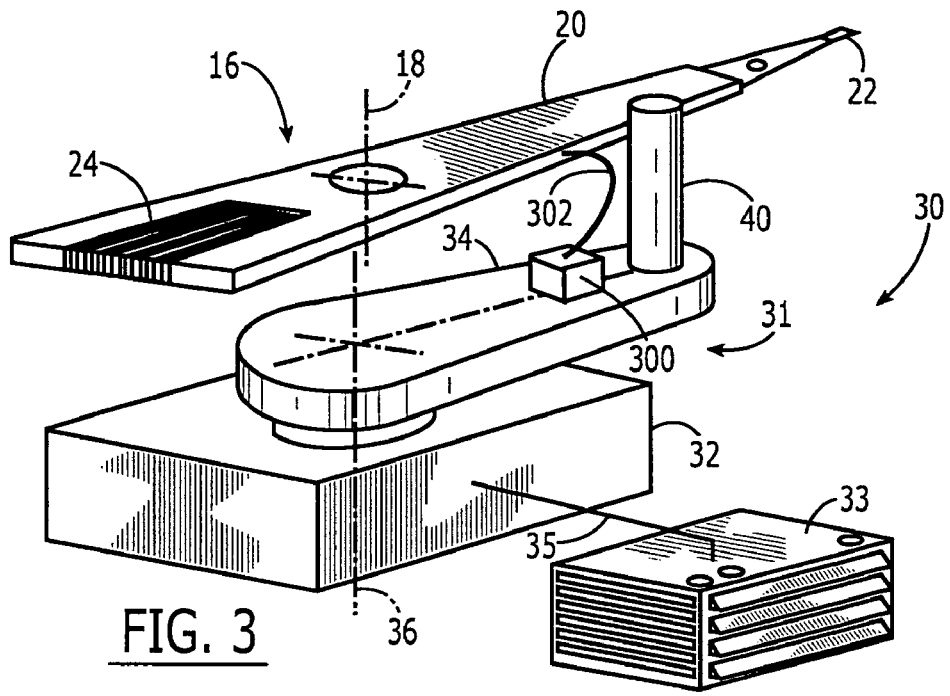
FIG. 3 is a schematic, perspective view of a positioning system of a servo writer according to some embodiments of the present invention.

FIG. 3 illustrates a servo writer 30 that is configured in accordance with some embodiments of the present invention. The servo writer 30 includes a positioning system 31, a control unit 33 that is configured to control servo writing functions of the servo writer 30, a pivot arm 34, a push-arm 40, and a positioner 32. A proximate end of the pivot arm 34 is connected to the positioner 32 and a distal end of the pivot arm 34 is connected to the push-arm 40. The positioner 32 is configured to rotate the pivot arm 34 about a positioner axis 36 to move the push-arm 40 along an arc.

The positioning system 31 of the servo writer 30 is configured so that at least a portion of the push-arm 40 fits through a push-arm hole 28 on the base plate 26 of the disk drive 10 (FIGS. 1–2) and contacts the actuator arm 20 (FIG. 3). The positioning system 31 is further configured so that the rotation of the pivot arm 34 about the positioner axis 36 and pushes the actuator arm 20 to radially position the head 22 relative to a respective surface of the disks 12. The pivot bearing axis 18 of the disk drive 10 and the positioner axis 36 of servo writer positioning system 31 may be substantially aligned so that the push-arm 40 may not exhibit any substantial tangential motion along the actuator arm 20 while pushing the actuator arm 20.

Accordingly, servo writing operations can be undertaken after the above-described components of the disk drive 10 have been connected to the base plate 26 and a cover may be connected thereto. The push-arm 40 of the servo writer 30 is positioned to protrude through the push-arm hole 28 on the base plate 26 of the disk drive 10 to interface with an appropriate surface of the actuator arm assembly 16, such as with a surface of an actuator tab that extends outwardly from a side of the actuator arm 20 toward the push-arm 40. The control unit 33 controls the positioner 32, via communication path 35, to move the push-arm 40 to push the actuator arm 20 and radially position the head 22 at a selected radial location on a surface of the disks 12. The control unit 33 writes servo fields through the head 22 along an arc at the defined radial location on the disk. The control unit 33 incrementally moves the push-arm 40 to form servo fields at defined radial and circumferential locations across the disks 12. For example, the control unit 33 may write the servo fields in radially extending servo sectors around the disks 12. The servo fields on the disks 12 can be used to precisely define the location of concentric data tracks on the disk 12. After the servo fields have been written on the disks 12 to define the location of the data tracks, the push-arm 40 is withdrawn from the push-arm hole 28 and the push-arm hole 28 is then appropriately sealed.

As explained above, proper radial alignment of the servo fields is essential to facilitate reliable operation of the disc drive. However, vibrations can be generated by the operation of the disc drive spindle motor 15 and wind buffeting of the actuator arm 20 during rotation of the disks 12 as the servo fields are written. Such vibration can cause the push-arm 40 to vibrate against the actuator arm 20, and can result in improper radial alignment of the servo fields written onto the disks 12. In accordance with embodiments of the present invention, the servo writer 30 further includes a sensor that is configured to contact the actuator arm 20 and to generate an electrical vibration signal that is indicative of vibration between the push-arm 40 and the actuator arm 20 while the servo fields are written on the disks 12. In some embodiments, the sensor includes a stylus sensor that is connected to the push-arm 40, either directly or indirectly, and has a stylus member that contacts and is biased against the actuator arm 20 when the push-arm 40 contacts the actuator arm 20. The electrical vibration signal generated by the sensor may be indicative of vibration between the push-arm 40 and the actuator arm 20 along three orthogonal axis.

An exemplary embodiment of a sensor 300 is shown in FIG. 3. The sensor 300 is directly connected to the pivot arm 34 and includes a stylus member 302 with a distal end that is configured to extend through the push-arm hole 28 and be biased against the actuator arm 20 when the push-arm 40 contacts the actuator arm 20. Accordingly, as the actuator arm 20 and push-arm 40 vibrate apart and back together against one another, the distal end of the stylus member 302 may remain in contact with the actuator arm 20 and thereby sense the relative vibration between the push-arm 40 and the actuator arm 20. Accordingly, the push-arm hole 28 can exhibit any appropriate shape/configuration that avoids significantly hindering/obstructing movement of the push-arm 40 and the stylus member 302 during servo writing operations.

The sensor 300 may include a piezoelectric device connected to a proximate end of the stylus member 302. The piezoelectric device is configured to generate the electrical vibration signal responsive to vibration of the distal end of the stylus member 302.

The sensor 300 may alternatively include an inductive apparatus connected to a proximate end of the stylus member 302. The inductive apparatus is configured to vary its inductance responsive to vibration of the distal end of the stylus member 302. For example, vibration of the stylus member 302 may move an electrical coil relative to an iron rod to vary the inductance of the inductive apparatus. The vibration signal may be generated by conducting a current through the coil to sense variation in the inductance of the coil.

The sensor 300 may alternatively include a voltage generation apparatus connected to a proximate end of the stylus member 302. The apparatus is configured to generate current responsive to vibration of the distal end of the stylus member 302. For example, vibration of the stylus member 302 may move a permanent magnet relative to an electrical coil to generate voltage across the coil. The vibration signal may be generated based on variation in the voltage across the coil.

The electrical vibration signal may be used select a material with a known damping characteristic for use in the servo writer 30, such as to select a material that is used on a surface of the push-arm 40 that contacts the actuator arm 20 to dampen vibration that may occur between the actuator arm 20 and the push-arm 40.

Figure 4:
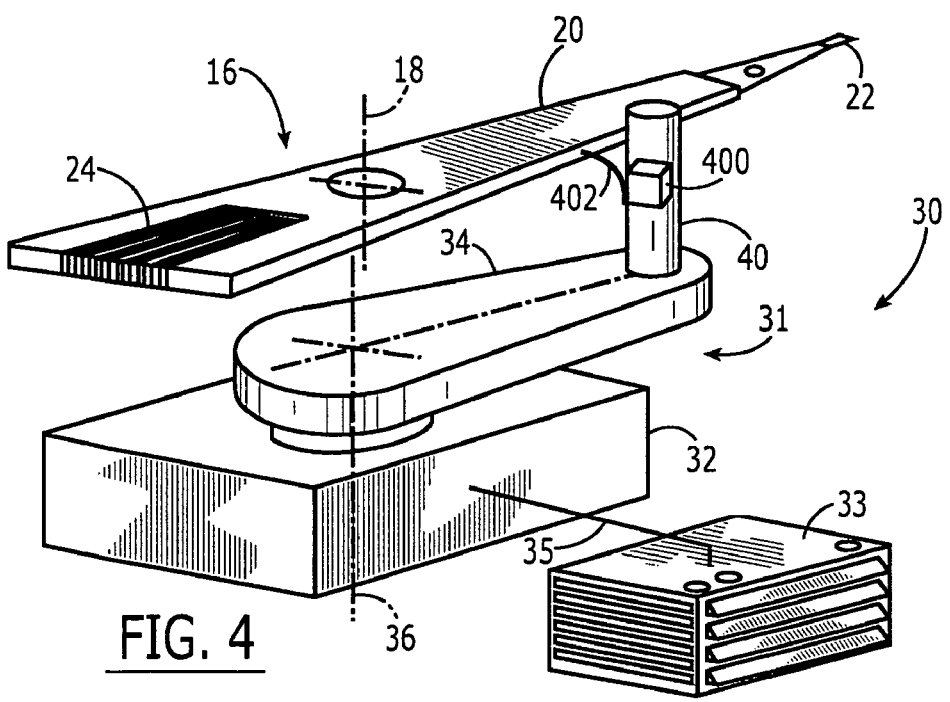
FIG. 4 is a schematic, perspective view of a positioning system of a servo writer according to some embodiments of the present invention.

FIG. 4 illustrates another exemplary embodiment of a sensor 400 which is directly connected to the push-arm 40. The sensor 400 may include a stylus sensor with a stylus member 402. The stylus sensor may be generally configured as described above with regard to FIG. 3, except that the stylus member 402 may extend away from the push-arm 40 and be biased to press against the actuator arm 20 when the push-arm 40 contacts the actuator arm 20. Accordingly, the sensor 400 may reside below the push-arm hole 28 with the stylus member 402 reaching through the hole 28 to contact the actuator arm 20, or the hole 28 may exhibit any appropriate shape/configuration so that the sensor 400 can be moved entirely through or reside at least partially within the push-arm hole 28 without significantly hindering/obstructing movement of the push-arm 40 during servo writing operations.

Figure 5:
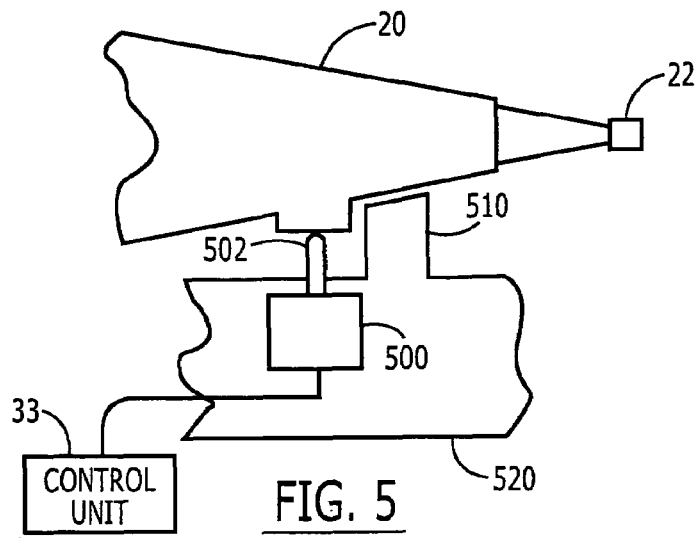
FIG. 5 is a schematic view of a portion of a positioning system of a servo writer according to some embodiments of the present invention.

FIG. 5 illustrates another exemplary embodiment of a sensor 500 which is directly connected to a movement arm 520. The movement arm 520 includes a push-arm 510. The movement arm 520 is connected to a positioner, which may be configured as described for the positioner 32 of FIG. 3, and configured to move the push-arm 510 to push the actuator arm 20 and radially position the head 22 at a selected radial location on a surface of the disks 12. Instead of the movement arm 520 being on an opposite side of the base plate 26 from the actuator arm 20, such as described with regard to FIGS. 1 and 2, it may instead be on the same side of the base plate 26 as the actuator arm 20 and may engage the actuator arm 20 while it is exposed before a cover is connected to the disk drive 10. The movement arm 520 may be configured to rotate such as described above for the pivot arm 34, or it may otherwise be moved in any appropriate manner by a positioner to push the actuator arm 20 to position the head 22 at defined locations on the disks 12. The sensor 500 may include a stylus sensor with a stylus member 502. The stylus sensor may be generally configured as described above with regard to FIGS. 3 and 4 with the stylus member 502 being biased to press against the actuator arm 20 when the push-arm 510 contacts the actuator arm 20.

The control unit 33 can be configured to control the positioner responsive to the vibration signal from the sensor to move the push-arm to reduce vibration between the actuator arm and the push-arm. Such control is explained with regard to the exemplary embodiment servo writer shown in FIG. 3, however, it is to be understood that this control may be carried out in the servo writer embodiments shown in FIGS. 4 and 5 and that it is not limited to the exemplary servo writer embodiments disclosed herein.

With reference to FIG. 3, the control unit 33 can be configured to control movement by the positioner 32 to move the push-arm 40 out-of-phase to the indicated vibration to dampen vibration between the actuator arm 20 and the push-arm 40. For example, the control unit 33 may control the positioner 32 to move the push-arm 40 at a phase angle of about 180 degrees relative to the indicated vibration to substantially cancel vibration between the actuator arm 20 and the push-arm 40.

Figure 6:
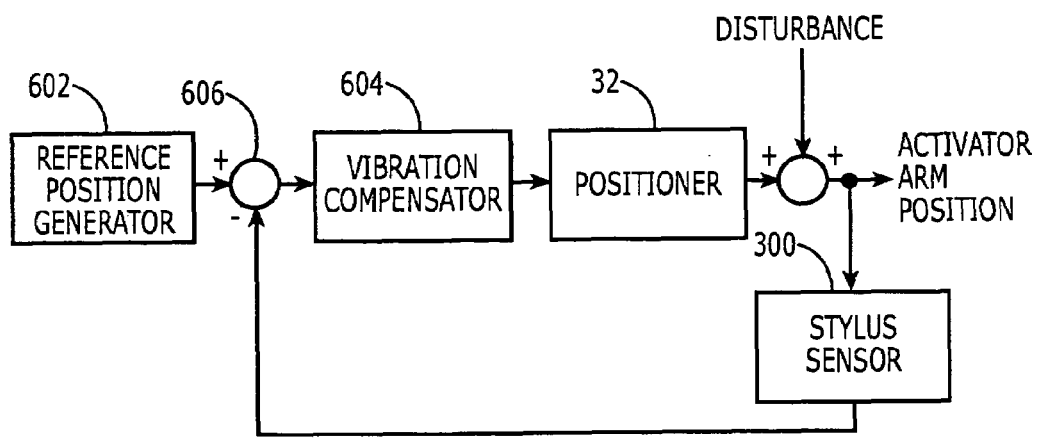
FIG. 6 is a block diagram of a control loop of control unit for a servo track writer according to some embodiments of the present invention.

FIG. 6 shows an exemplary control loop that may be implemented at least partially within the control unit 33 according to some embodiments of the present invention. The control unit 33 can include a reference position generator 602 and a vibration compensator 604. The reference position generator 602 generates a reference position signal that is configured to move the push-arm 40 a defined distance to push the actuator arm 20 and position the head 22 at defined radial location on the disk 12. The control unit 33 can then write the servo fields at that radial location along an arc on the disk 12. The reference position generator 602 may incrementally change the reference position signal to incrementally position the head 22 at defined locations on the disk 12 and form, for example, servo sectors on the disk 12. The vibration signal from the stylus sensor 300 is combined (e.g., subtracted) at a summation node 606 from the reference position signal to form a position error signal that is provided to the vibration compensator 604. As explained above, the stylus sensor generates the vibration signal responsive to vibration sensed between the actuator arm 20 and the push-arm 40 due to disturbances ("DISTURBANCES" shown in FIG. 6). The vibration compensator 604 generates a control signal to the positioner 32 that moves the push-arm 40 to actively dampen vibration between the actuator arm 20 and the push-arm 40.

The actuator motor 24 (FIG. 1) can be controlled to provide a bias force in a direction opposite that of the force exerted on the actuator arm 20 by the positioner 32 via the pivot arm 34 and push-arm 40. Such a bias force may function to substantially maintain the actuator arm 20 against the push-arm 40 so that the control unit 33 can position the head 22 by positioning the push-arm 40 in a controlled and accurate manner. However, as explained above, vibration can occur between the actuator arm 20 and the push-arm 40 so that the position of the head 22 may vary from a desired position while the servo fields are being written. The control unit 33 may be configured to control the actuator motor 24 to vary the bias force of the actuator arm 20 against the push-arm 40 responsive to the vibration signal from the sensor 300. For example, the control unit 33 may control the actuator motor to increase the bias force of the actuator arm 20 against the push-arm 40 responsive to the vibration signal indicating an increase in vibration and to control the actuator motor to decrease the bias force responsive to the vibration signal indicating a decrease in vibration. Accordingly, the control unit 33 may reduce vibration between the actuator arm 20 and the push-arm 40 by varying the bias therebetween as needed to reduce vibration. The level of bias force may thereby be adjusted responsive to the observed level of vibration, and may be defined so as not to present an unacceptable amount of force against the actuator arm assembly 16, the actuator motor 24, and/or other components of the disk drive 10 which may otherwise reduce the accuracy with which servo fields can be positioned on the disks 12 and/or damage components of the disk drive 10.

The control unit 33 may be configured to log a series of samples of the vibration signal while servo fields are written through the head 22 on the disks 12. The sampled vibration signal log may then be analyzed to improve the design of the servo writer 30, the disk drive 10, and/or to allow compensation for the observed vibration during the manufacturing of the disk drive 10, such as through variation of parameters within the control loops of the disk drive 10.

The control unit 33 may be configured to prevent servo fields from being written on the disk responsive to the vibration signal indicating at least a threshold amount of vibration. Accordingly, writing of servo fields on the disks 12 may be interrupted when the vibration signal indicates that at least a threshold vibration level has been observed by the sensor 300. An operator may be notified of an excessive vibration condition, which may indicate a failure of the disk drive 10, and/or writing of the servo fields may be allowed to continue responsive to the observed vibration level returning below the threshold level. Alternatively, or additionally, the control unit 33 may initiate at least a partial rewrite of servo fields on the disks 12 responsive to the vibration signal indicating that at least a threshold vibration level has been observed by the sensor 300.

Figure 7:
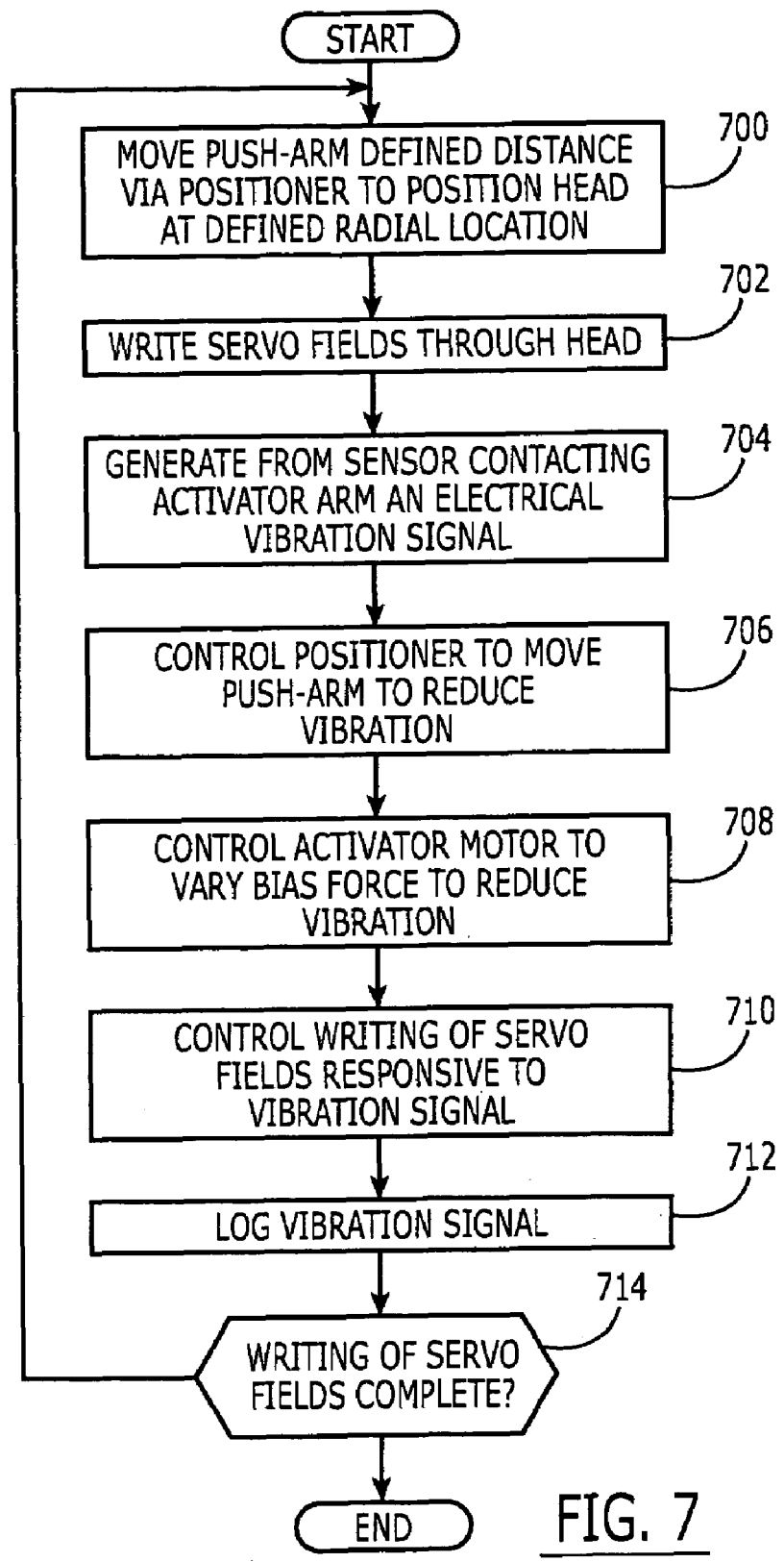
FIG. 7 is a flowchart of operations for making a disk drive using a servo writer with a vibration sensor in accordance with some embodiments of the present invention.

FIG. 7 is a flowchart of operations which summarizes the operations described above which may be carried out to make a disk drive using a servo writer in accordance with some embodiments of the present invention. A push-arm is moved a defined distance (Block 700) via a positioner to push an actuator arm and position a head at a defined radial location on a disk. Servo fields are written (Block 702) through the head on the disk. An electrical vibration signal is generated (Block 704) through a sensor that contacts the actuator arm. The positioner may be controlled (Block 706) to move the push-arm to reduce vibration. The actuator motor may be controlled (Block 708) to vary a bias force of the actuator arm against the push-arm to reduce vibration therebetween. The writing of servo fields on the disk may be controlled (Block 710) responsive to the vibration signal. The vibration signal may be logged (Block 712) as a series of measurements. A decision is made (Block 714) as to whether further servo fields remain to be written at other radial locations on the disk and, if so, operation may loop back to Block 700 until writing of the servo fields is completed.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of making a disk drive, wherein the disk drive comprises a data storage disk, an actuator arm, and a head connected to the actuator arm, and the disk drive is connected to a servo writer that comprises a push-arm configured to move the actuator arm radially relative to the disk, the method comprising:
   moving the push-arm of the servo writer a defined distance to push the actuator arm and position the head at a defined radial location on the disk;
   writing servo fields through the head along an arc at the defined radial location on the disk; and
   generating an electrical vibration signal with a stylus sensor connected to the push-arm and having a stylus member that contacts and is biased against the actuator arm when the push-arm contacts the actuator arm, wherein the electrical vibration signal is indicative of vibration between the stylus member and the push-arm.

2. The method of claim 1, wherein the stylus member has a proximate end that is connected to a piezoelectric device that is configured to generate the vibration signal responsive to vibration of a distal end of the stylus member.

3. The method of claim 1, wherein the stylus sensor comprises an inductive apparatus that is connected to a proximate end of the stylus member and is configured to vary its inductance responsive to vibration of a distal end of the stylus member, and wherein the vibration signal is generated based on variation in the inductance of the inductive apparatus.

4. The method of claim 1, wherein the stylus sensor comprises a voltage generator apparatus that is connected to a proximate end of the stylus member and is configured to generate a voltage signal responsive to vibration of a distal end of the stylus member, and wherein the vibration signal is generated based on variation in the voltage signal from the voltage generator apparatus.

5. The method of claim 1, wherein the stylus sensor is directly connected to the push-arm.

6. The method of claim 1, wherein the servo writer further comprises a pivot arm with a distal end connected to the push-arm and a proximate end connected to a positioning motor configured to rotate the pivot arm to move the push-arm along an arc, wherein the stylus sensor is directly connected to the pivot arm.

7. The method of claim 1, further comprising preventing servo fields from being written on the disk responsive to the vibration signal indicating more than a threshold amount of vibration.

8. The method of claim 1, wherein the electrical vibration signal generated by the sensor is indicative of vibration along three orthogonal axes.

9. A method of making a disk drive, wherein the disk drive comprises a data storage disk, an actuator arm, and a head connected to the actuator arm, and the disk drive is connected to a servo writer that comprises a push-arm configured to move the actuator arm radially relative to the disk, the method comprising:
   moving the push-arm of the servo writer a defined distance to push the actuator arm and position the head at a defined radial location on the disk;
   writing servo fields through the head along an arc at the defined radial location on the disk;
   generating from a sensor that contacts the actuator arm an electrical vibration signal that is indicative of vibration between the push-arm and the actuator arm; and
   controlling movement of the push-arm responsive to the vibration signal to reduce vibration between the actuator arm and the push-arm.

10. The method of claim 9, further comprising moving the push-arm out-of-phase to the vibration indicated by the vibration signal to dampen the vibration between the actuator arm and the push-arm.

11. A method of making a disk drive, wherein the disk drive comprises a data storage disk, an actuator arm, and a head connected to the actuator arm, and the disk drive is connected to a servo writer that comprises a push-arm configured to move the actuator arm radially relative to the disk, the method comprising:
   moving the push-arm of the servo writer a defined distance to push the actuator arm and position the head at a defined radial location on the disk;
   writing servo fields through the head along an arc at the defined radial location on the disk;
   generating from a sensor that contacts the actuator arm an electrical vibration signal that is indicative of vibration between the push-arm and the actuator arm; and
   controlling an actuator motor, which radially positions the actuator arm relative to the disk, to vary bias force of the actuator arm against the push-arm responsive to the vibration signal.

12. The method of claim 11, wherein controlling the actuator motor to vary bias force of the actuator arm against the push-arm responsive to the vibration signal comprises controlling the actuator motor to increase the bias force of the actuator arm against the push-arm responsive to the vibration signal indicating an increase in vibration and controlling the actuator motor to decrease the bias force of the actuator arm against the push-arm responsive to the vibration signal indicating a decrease in vibration.

13. A method of making a disk drive, wherein the disk drive comprises a data storage disk, an actuator arm, and a head connected to the actuator arm, and the disk drive is connected to a servo writer that comprises a push-arm configured to move the actuator arm radially relative to the disk, the method comprising:
  moving the push-arm of the servo writer a defined distance to push the actuator arm and position the head at a defined radial location on the disk;
  writing servo fields through the head along an arc at the defined radial location on the disk;
  generating from a sensor that contacts the actuator arm an electrical vibration signal that is indicative of vibration between the push-arm and the actuator arm; and
  logging a series of samples of the vibration signal while servo fields are written through the head on the disk.

14. A method of making a disk drive, wherein the disk drive comprises a data storage disk, an actuator arm, and a head connected to the actuator arm, and the disk drive is connected to a servo writer that comprises a push-arm configured to move the actuator arm radially relative to the disk, the method comprising:
  moving the push-arm of the servo writer a defined distance to push the actuator arm and position the head at a defined radial location on the disk;
  writing servo fields through the head along an arc at the defined radial location on the disk;
  generating from a sensor that contacts the actuator arm an electrical vibration signal that is indicative of vibration between the push-arm and the actuator arm; and
  initiating at least a partial rewrite of servo fields on the disk responsive to the vibration signal indicating more than a threshold amount of vibration.

15. A method of making a disk drive, wherein the disk drive comprises a data storage disk, an actuator arm, and a head connected to the actuator arm, and the disk drive is connected to a servo writer that comprises a push-arm configured to move the actuator arm radially relative to the disk, the method comprising:
  moving the push-arm of the servo writer a defined distance to push the actuator arm and position the head at a defined radial location on the disk;
  writing servo fields through the head along an arc at the defined radial location on the disk;
  generating from a sensor that contacts the actuator arm an electrical vibration signal that is indicative of vibration between the push-arm and the actuator arm; and
  using the electrical vibration signal generated by the sensor to select a material with a known damping characteristic for use in the servo writer.

16. The method of claim 15, further comprising using the electrical vibration signal generated by the sensor to select a material with a known damping characteristic for use on the push-arm to dampen vibration with an actuator arm of a disk drive.

17. A servo writer configured to write servo fields in a disk drive, the disk drive comprising a data storage disk, an actuator arm, and a head connected to the actuator arm, the servo writer comprising:
  a push-arm that is configured to radially move the actuator arm relative to the disk;
  a positioner that is configured to move the push-arm a defined distance to push the actuator arm and position the head at a defined radial location on the disk;
  a sensor that is configured to contact the actuator arm and to generate an electrical vibration signal that is indicative of vibration between the push-arm and the actuator arm; and
  a control unit that is configured to write servo fields through the head along an arc at the defined radial location on the disk while the sensor is generating the vibration signal indicative of relative vibration between the push-arm and the actuator arm.

18. The servo writer of claim 17, wherein the sensor comprises a stylus sensor connected to the push-arm and having a stylus member that contacts and is biased against the actuator arm when the push-arm contacts the actuator arm.

19. The servo writer of claim 18, wherein the stylus member has a proximate end that is connected to a piezoelectric device that is configured to generate the vibration signal responsive to vibration of a distal end of the stylus member.

20. The servo writer of claim 18, wherein the stylus sensor comprises an inductive apparatus that is connected to a proximate end of the stylus member and is configured to vary its inductance responsive to vibration of a distal end of the stylus member and the vibration signal is generated based on variation in the inductance of the inductive apparatus.

21. The servo writer of claim 18, wherein the stylus sensor comprises a voltage generator apparatus that is connected to a proximate end of the stylus member and is configured to generate a voltage signal responsive to vibration of a distal end of the stylus member and the vibration signal is generated based on variation in the voltage signal from the voltage generator apparatus.

22. The servo writer of claim 18, wherein the stylus sensor is directly connected to the push-arm.

23. The servo writer of claim 18, further comprising a pivot arm with a distal end connected to the push-arm and a proximate end connected to the positioner, wherein the positioner is configured to rotate the pivot arm to move the push-arm along an arc, wherein the stylus sensor is directly connected to the pivot arm.

24. The servo writer of claim 17, further comprising a control unit that is configured to control movement of the push-arm by the positioner responsive to the vibration signal to reduce vibration between the actuator arm and the push-arm.

25. The servo writer of claim 17, further comprising a control unit that is configured to control movement of the push-arm by the positioner responsive to the vibration signal to move the push-arm out-of-phase to the indicated vibration to dampen vibration between the actuator arm and the push-arm.

26. The servo writer of claim 17, wherein the disk drive further comprises an actuator motor that is configured to radially position the actuator arm relative to the disk, and the servo writer further comprises a control unit that is configured to control the actuator motor to vary bias force of the actuator arm against the push-arm responsive to the vibration signal.

27. The servo writer of claim 26, wherein the control unit is further configured to control the actuator motor to increase the bias force of the actuator arm against the push-arm responsive to the vibration signal indicating an increase in vibration and to control the actuator motor to decrease the bias force of the actuator arm against the push-arm responsive to the vibration signal indicating a decrease in vibration.

28. The servo writer of claim 17, further comprising a control unit that is configured to log a series of samples of the vibration signal while servo fields are written through the head on the disk.

29. The servo writer of claim 17, further comprising a control unit that is configured to prevent servo fields from being written on the disk responsive to the vibration signal indicating at least a threshold amount of vibration.

30. The servo writer of claim 17, further comprising a control unit that is configured to initiate at least a partial rewrite of servo fields on the disk responsive to the vibration signal indicating at least a threshold amount of vibration.

* * * * *